(12) United States Patent
Ennsmann

(10) Patent No.: US 8,091,446 B2
(45) Date of Patent: Jan. 10, 2012

(54) REVERSE GEAR LOCKING MECHANISM FOR VEHICLE

(75) Inventor: Roland Ennsmann, Wels (AT)

(73) Assignee: BRP-Powertrain GmbH & Co. KG, Gunskirchen (AT)

( * ) Notice: Subject to any disclaimer, the term of this patent is extended or adjusted under 35 U.S.C. 154(b) by 1105 days.

(21) Appl. No.: 11/930,565

(22) Filed: Oct. 31, 2007

(65) Prior Publication Data

US 2009/0107277 A1  Apr. 30, 2009

(51) Int. Cl.
*G05G 5/00* (2006.01)
*F16H 61/18* (2006.01)
(52) U.S. Cl. .................... 74/337.5; 74/473.22
(58) Field of Classification Search .......... None
See application file for complete search history.

(56) References Cited

U.S. PATENT DOCUMENTS

| | | | | | |
|---|---|---|---|---|---|
| 4,275,614 | A | * | 6/1981 | Okubo et al. | 74/473.28 |
| 4,624,350 | A | * | 11/1986 | Akashi | 192/220 |
| 4,754,662 | A | * | 7/1988 | Misawa | 74/473.22 |
| 2008/0060868 | A1 | * | 3/2008 | Takano et al. | 180/336 |

* cited by examiner

*Primary Examiner* — Justin Holmes
*Assistant Examiner* — Jacob S Scott
(74) *Attorney, Agent, or Firm* — Osler, Hoskin & Harcourt LLP

(57) ABSTRACT

A transmission for a vehicle is disclosed. The transmission has a reverse gear locking device that includes a rotating shaft having a longitudinal axis, the rotating shaft adapted for rotational movement about its longitudinal axis, and a lock connected to the rotating shaft and positioned in alignment with a stopper extending from the shift drum of the transmission. The initial position of the lock prevents the shift drum from engaging the reverse gear. A rotational movement of the rotating shaft tilts the lock out of alignment with the stopper and allows the shift drum to engage the reverse gear.

15 Claims, 7 Drawing Sheets

REVERSE GEAR LOCKING MECHANISM FOR VEHICLE

FIELD OF THE INVENTION

The present invention relates to transmissions for vehicles and to reverse gear locking mechanisms for vehicles in particular.

BACKGROUND OF THE INVENTION

Taking all-terrain vehicle (ATV) as an example, an ATV typically includes front wheels and rear wheels suspended on a front end and on a rear end, respectively, of a body frame. Handlebars and a seat are mounted on the frame. A power unit such as an engine is also mounted on the frame and generates the power required to propel the ATV. A transmission is provided to transfer the power generated by the engine to the front wheels, the rear wheels or both the front and rear wheels to drive the ATV. Typically, the ATV operator moves the transmission to a neutral or geared position when the ATV is not in use, the geared position being preferred to immobilize the ATV.

The transmission of an ATV typically includes a reverse gear to back up the vehicle when required as is standard in many vehicles. The reverse gear of the transmission of an ATV, as in many other straddle-type vehicles, is accessible by bringing the transmission down from the neutral position to the $1^{st}$ forward gear and shifting down once more into the reverse gear. The shifting interface with the operator of an ATV is typically via a shift pedal with a clutch handle on the left-hand side of the handle bars.

In operation, the All Terrain Vehicle (ATV), as its name implies, is often used over rough terrains. In rough terrains, when the operator of the ATV is downshifting into first gear or into the neutral position, there is a possibility that the operator accidentally shifts down into the reverse gear while the ATV is still moving forward. This could damage the gearbox.

Reverse gear locking mechanism exist and have been installed on ATV in order to prevent accidental shifting into reverse gear while the ATV is still going forward. Prior art reverse gear locking mechanism typically consist of actuated lock shafts mounted parallel to the shift drum of the transmission of the ATV which are moved back and forth into and out of engagement with the shift drum. The drawback of the layout of those actuated lock shafts in parallel with the shift drum and the corresponding movement of the actuated lock shafts parallel to the axis of rotation of the shift drum, is that space is very limited in this area aligned with the shift drum for positioning the actuator (lever or others) outside the transmission and for actuating the lock shaft. The gear selector is typically aligned with the shift drum on one side of the transmission and the chain sprocket on the other side of the transmission.

Thus, there is a need for an improved mechanism to prevent accidental shifting into reverse gear.

SUMMARY OF THE INVENTION

It is an object of the present invention to ameliorate at least some of the inconveniences present in the prior art.

It is also an object of the present invention to provide a transmission having a reverse gear locking mechanism.

In one aspect, the present invention provides a transmission for a vehicle, the transmission comprising: a casing; an output shaft positioned inside the casing and having at least one output gear; an input shaft positioned inside the casing and having at least one input gear; a reverse gear mounted onto a shaft positioned between the output shaft and the input shaft; at least one shift fork engaging one of the at least one output gear and at least one input gear; a rotatable shift drum having an axis of rotation, the shift drum operatively connected to the at least one shift fork, the shift drum and the at least one shift fork cooperating to engage at least one of the at least one output gear, the at least one input gear and the reverse gear when the shift drum is rotated, the shift drum having a body and a stopper extending from the body of the shift drum; a reverse gear locking device including a rotating shaft having a longitudinal axis, the rotating shaft adapted for rotational movement about its longitudinal axis, and a lock connected to the rotating shaft and positioned in alignment with the shift drum, the lock having an initial position where the lock is aligned with the stopper of the shift drum and prevents rotation of the shift drum to engage the reverse gear, and a second position where the lock is not aligned with the stopper of the shift drum and allows rotation of the shift drum so as to permit engagement of the reverse gear, wherein the lock is moved from its initial position to its second position by a rotational movement of the rotating shaft about its longitudinal axis.

In a further aspect, the longitudinal axis of the rotating shaft of the reverse gear locking device is substantially perpendicular to the axis of rotation of the shift drum.

In a further aspect, the reverse gear locking device further comprises a lever connected to one end of the rotating shaft, the lever including a connector, the lever extending out of the transmission casing and adapted for connexion to an actuator controlled by an operator of the vehicle.

In a further aspect, the reverse gear locking device further includes a lever connected to an end of the rotating shaft, the lever including a connecter adapted for connection to an actuator controlled by an operator of the vehicle.

In another aspect, the lever is disposed outside the transmission casing and extends at a rear portion of the transmission casing.

In another aspect, the body of the shift drum is generally cylindrical; the lock is positioned adjacent to the shift drum and includes a curve profile that conforms to the generally cylindrical body of the shift drum.

In yet another aspect, the reverse gear locking device further comprises a spring biasing the lock toward its initial locking position.

In another aspect, the lock includes an extension adapted to prevent over rotation of the lock by the force of the coil spring when the lock is in its initial locking position.

In one aspect, the present invention provides a vehicle having: a frame; an engine supported by the frame; at least two wheels connected to the frame via a suspension; a seat disposed on the frame; a steering member disposed in front of the seat for steering the vehicle, a shift lever; a transmission connected to the engine and operatively connected to at least one of the at least two wheels, the transmission including: a casing; an output shaft positioned inside the casing and having at least one output gear; an input shaft positioned inside the casing and having at least one input gear; a reverse gear mounted onto a shaft positioned between the output shaft and the input shaft; at least one shift fork engaging one of the at least one output gear and at least one input gear; a rotatable shift drum having an axis of rotation, the shift drum operatively connected to the at least one shift fork, the shift drum and the at least one shift fork cooperating to engage at least one of the at least one output gear, the at least one input gear and the reverse gear when the shift drum is rotated, the shift drum having a body and a stopper extending from the body of the shift drum; a reverse gear locking device including a rotating shaft having a longitudinal axis, the rotating shaft adapted for rotational movement about its longitudinal axis, and a lock connected to the rotating shaft and positioned in alignment with the stopper of the shift drum thereby preventing the shift drum from engaging the reverse gear; wherein a rotational movement of the rotating shaft tilts the lock out of alignment with the stopper thereby allowing the shift drum to rotate so as to permit engagement of the reverse gear.

In another aspect, the longitudinal axis of the rotating shaft is substantially perpendicular to the axis of rotation of the shift drum.

In another aspect, the reverse gear locking device further includes a lever connected to an end of the rotating shaft, the lever including a connecter adapted for connection to an actuator controlled by an operator of the vehicle. The lever is disposed outside the transmission casing and extends at a rear portion of the transmission casing.

In one aspect, the present invention provides a transmission for a vehicle, the transmission comprising: a casing; an output shaft positioned inside the casing and having at least one output gear; an input shaft positioned inside the casing and having at least one input gear; a reverse gear mounted onto a shaft positioned between the output shaft and the input shaft; at least one shift fork engaging one of the at least one output gear and at least one input gear; a rotatable shift drum having an axis of rotation, the shift drum operatively connected to the at least one shift fork; the shift drum and the at least one shift fork cooperating to engage at least one of the at least one output gear, at least one input gear and reverse gear when the shift drum is rotated, the shift drum having a body and a stopper extending from the body of the shift drum; and a reverse gear locking device including a rotating shaft having a longitudinal axis, the rotating shaft adapted for rotational movement about its longitudinal axis, a lock connected to the rotating shaft and positioned in alignment with the stopper of the shift drum thereby preventing the shift drum from engaging the reverse gear; wherein a rotational movement of the rotating shaft tilts the lock out of alignment with the stopper thereby allowing the shift drum to rotate pass the lock so as to permit engagement of the reverse gear.

In yet another aspect, the lock includes a locking surface which is angled in alignment with the axis of rotation of the shift drum, the locking surface adapted to abut against the stopper of the shift drum.

In a further aspect, the reverse gear locking device further comprises a spring biasing the lock toward its initial position.

In another aspect, the stopper of the shift drum has a cylindrical shape to minimize friction between the stopper and the lock when the shift drum is rotating with the lock in the second position.

For purposes of this application, the terms "substantially perpendicular" mean forming an angle of ±15° from 90° or between 75° and 105°.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Although the invention will be described herein installed in an ATV, the invention could also be used in other types of vehicles.

Figure 1:
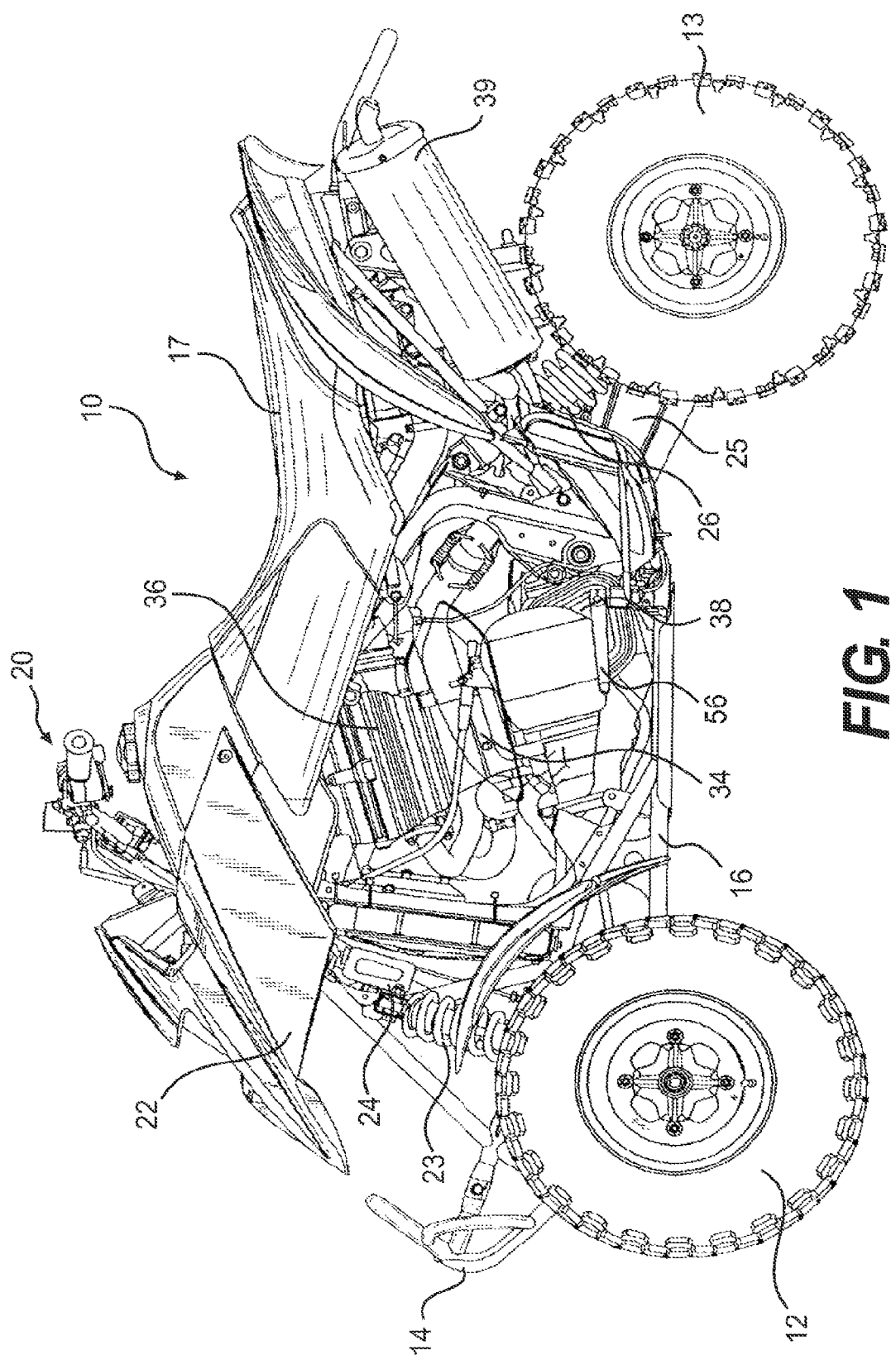
FIG. 1 is a left side elevation view of an all-terrain vehicle having a transmission in accordance with an embodiment of the invention.
Figure 2:
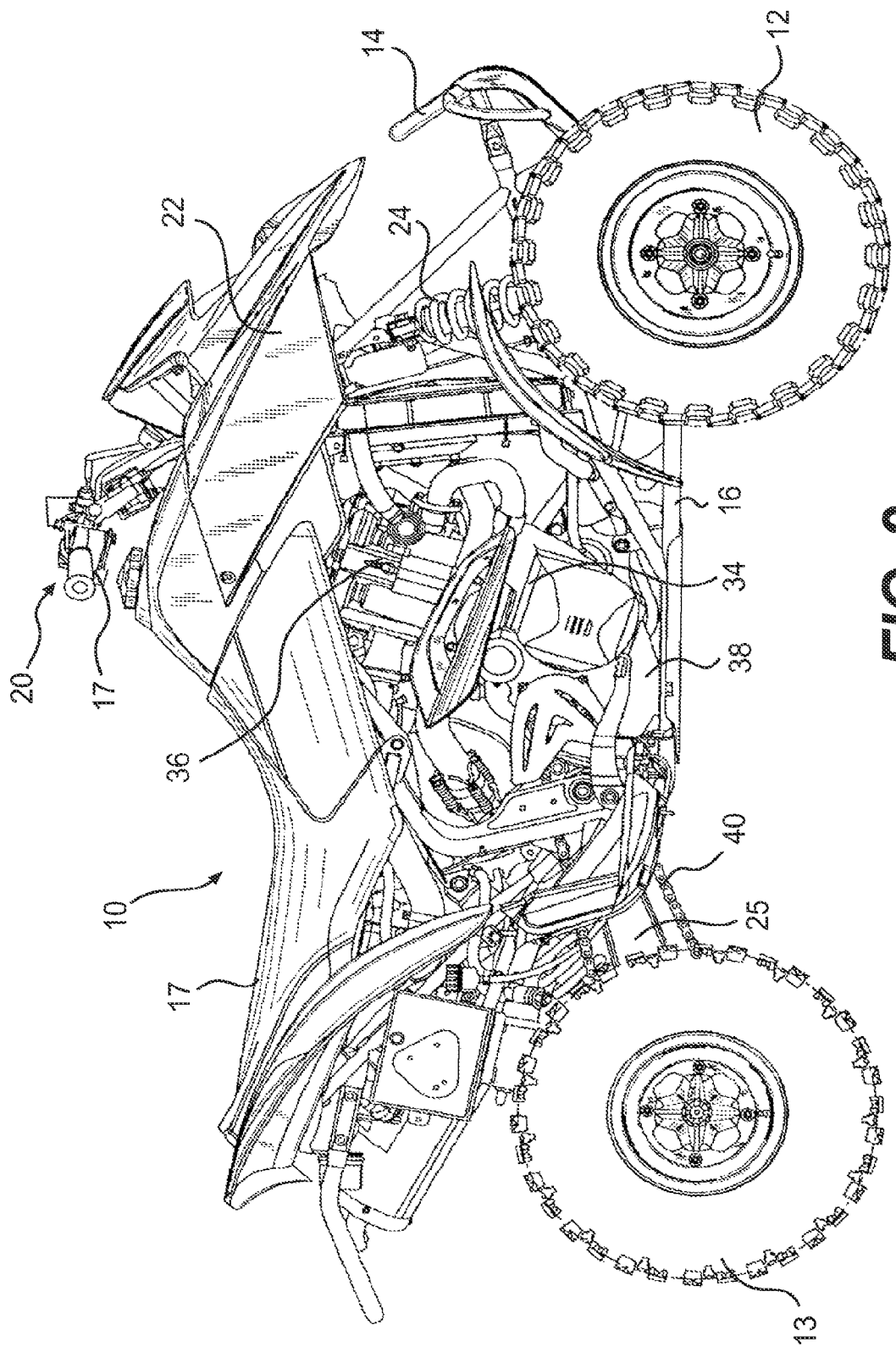
FIG. 2 is a right side elevation view of the all-terrain vehicle illustrated in FIG. 1.

FIGS. 1 and 2 illustrate an ATV 10 equipped with a mechanism to prevent accidental shifting into reverse gear in accordance with an embodiment of the invention. The vehicle 10 has a pair of front wheel assemblies 12 and a pair of rear wheel assemblies 13. The ATV 10 includes a straddle seat 17 positioned over the engine/transmission assembly 34 and a steering system which includes a steering member in the form of handlebars 20 to transfer steering commands of the driver to the front wheel assemblies 12. The ATV 10 also features bodywork 22 and a front bumper 14.

The ATV 10 includes a frame 16 supporting and housing the engine/transmission assembly 34 positioned between the front wheels assemblies 12 and the rear wheel assemblies 13. A muffler 39 extending at the rear of the ATV 10 is connected to the exhaust system of the ATV 10. The front wheel assemblies 12 are connected to the front portion of frame 30 via a front suspension system 24 including shock absorber/coil spring assemblies 23 disposed on both sides of frame 30. The rear wheel assemblies 13 are connected to the rear portion of frame 30 via a rear suspension system 25 including shock absorber/coil spring assemblies 26. The engine/transmission assembly 34 includes an engine 36 directly connected to a transmission 38. The transmission 38 may be integrated or partially integrated with the casing of engine 36. The transmission 38 includes a series of gears and gear-shift mechanism, described in greater details below, to implement the appropriate gear ratio for a given situation. The transmission 38 is operatively connected to the engine 36 to transmit engine torque. The engine torque is transmitted from the engine 36 to the transmission 38, and from the transmission 38 to the rear wheels assembly 13 via sprockets and driving chain 40 to provide motive power to the ATV 10. While the ATV 10 illustrated is of the rear wheel drive variety, the ATV 10 may be an all-wheel drive or a front wheel drive vehicle. The engine torque may also be transmitted from the transmission 38 to the rear wheels assembly 13 and/or the front wheels assembly 12 via driving shafts to provide motive power to the ATV 10 as is well known in the art.

Figure 3:
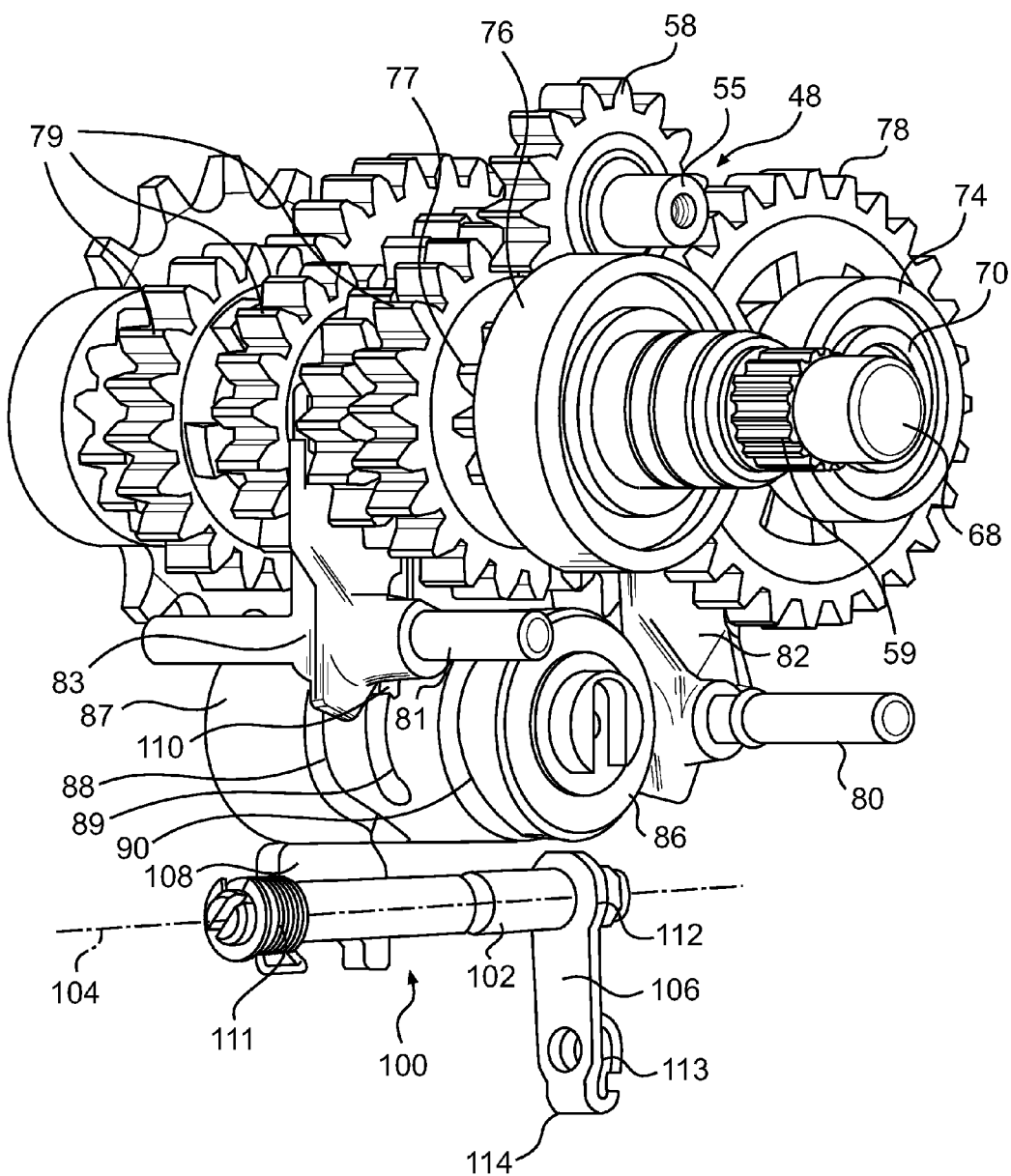
FIG. 3 is a front, left perspective view of the internal components of a transmission in accordance with an embodiment of the invention with the transmission casing removed.
Figure 4:
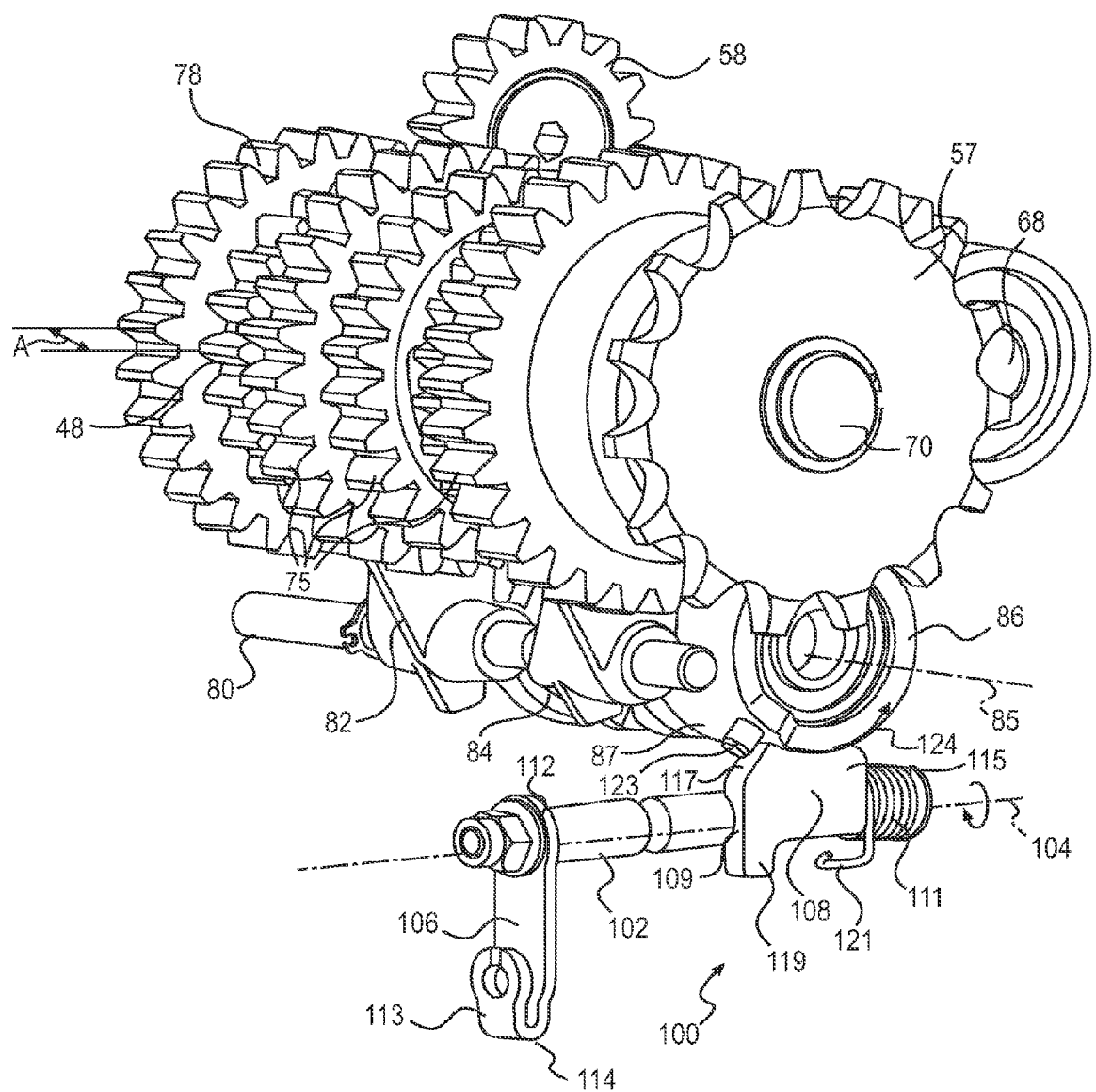
FIG. 4 is a rear, right perspective view of the internal components of the transmission shown in FIG. 3.

With reference to FIGS. 3 and 4 which illustrate the internal components (gears and gear-shift mechanism) of the transmission 38 respectively from the right front side of the transmission 38 (FIG. 3) and from the left rear side of the transmission 38 (FIG. 4), it can be seen that the main internal components of the transmission 38 include an output shaft 70 having a series of output gears 75 mounted on the output shaft 70; an input shaft 68 having a series of input gears 79 (FIG. 3) mounted thereon, a shift drum 86 and a wheel sprocket 57. The output shaft 70 is supported by a casing bearing 74, while the input shaft 68 is supported by a second casing bearing 76. The wheel sprocket 57 is connected to one end of the output shaft 70 to transfer motive power to the wheels 12 or 13 of the vehicle 10. Splined teeth 59 are machined on one end of the input shaft 68 and are operatively connected to the crankshaft of the engine 36 via a clutch system (not shown). A reverse gear 58 is mounted onto a third shaft 55 supported by the transmission casing. The reverse gear 58 is positioned between the output gears 75 and the input gears 79 and more specifically is engaged with the small gear 77 of the input shaft 68 and is also engaged with a idle gear 78 of the output shaft 70. The idle gear 78 is mounted to the output shaft 70 such that it is free to spin on the output shaft 70. A shift gear 48, as best seen in FIG. 4, is also mounted on the output shaft 70 and is positioned adjacent the idle gear 78. The shift gear 48 is operatively coupled the output shaft 70 for common rotation through splines on the inner surface of the shift gear 48 and the outer surface of the output shaft 70. The splines prevent relative rotational movement between the shift gear 48 and the output shaft 70 while permitting relative axial movement therebetween. The shift gear 48 includes a series of gear engaging elements aligned for engaging the sides of the idle gear 78 and consequently engaging the reverse gear 58. As is well known in the field of automotive transmissions, shift hubs having no circumferential teeth may be used instead of the shift gear 48 as gear engaging elements for engaging the sides of the idle gear 78 to effect gear changes.

As illustrated, a pair of shift forks 82 and 84 are operatively connected to the output gears 75 of the output shaft 70 and a single shift fork 83 is operatively connected to the input gears 79 of the input shaft 68. The shift forks 82 and 84 are slidably mounted onto a fork rod 80 supported by the transmission casing. The shift fork 83 is slidably mounted onto a second fork rod 81 also supported by the transmission casing. A shift drum 86 having a generally cylindrical body 87 including grooves 88, 89 and 90, is operatively connected to shift forks 82 and 84 of the output shaft 70 and to the shift fork 83 of the input shaft 68 via followers 110 inserted into the corresponding grooves 88, 89 and 90 of the shift drum 86. Thus, a rotation of the shift drum 86 imparts lateral motion to the shift forks 82, 83 and 84 which in turn move the input and output gears 75 and 79 along their respective shaft according to a pre-determined sequence defined by the pattern of the grooves 88, 89 and 90 as is well know in the art of geared power transmission.

A shifting assembly (not shown) is typically connected to the shift drum 86 and extends outwardly from the transmission casing so that it can be operatively engaged with a gear selector in the form of a foot pedal shift lever 56 (FIG. 2) that can be actuated by the operator of the vehicle to rotate the shift drum 86 thereby moving the shift forks 82, 83 and 84 via followers 110 which in turn slide the gears 75 and/or 79 along the input and output shafts 68 and 70 to effect gear changes. Obviously, other shifting mechanism may be connected to the shift drum 86 to effect gear changes as is known in the art.

As shown in FIGS. 3 and 4, the internal components of the transmission 38 also include a reverse gear lock device 100. The reverse gear lock device 100 includes a rotating shaft 102 adapted for rotational movement about its longitudinal axis 104. The longitudinal axis 104 is substantially perpendicular to the axis of rotation 85 of the shift drum 86. A lever 106 is connected to one end of the rotating shaft 102. A lock 108 is connected to a side portion 109 of the rotating shaft 102 and positioned in alignment with the shift drum 86. A coil spring 111 is positioned over the rotating shaft 102.

Figure 7:
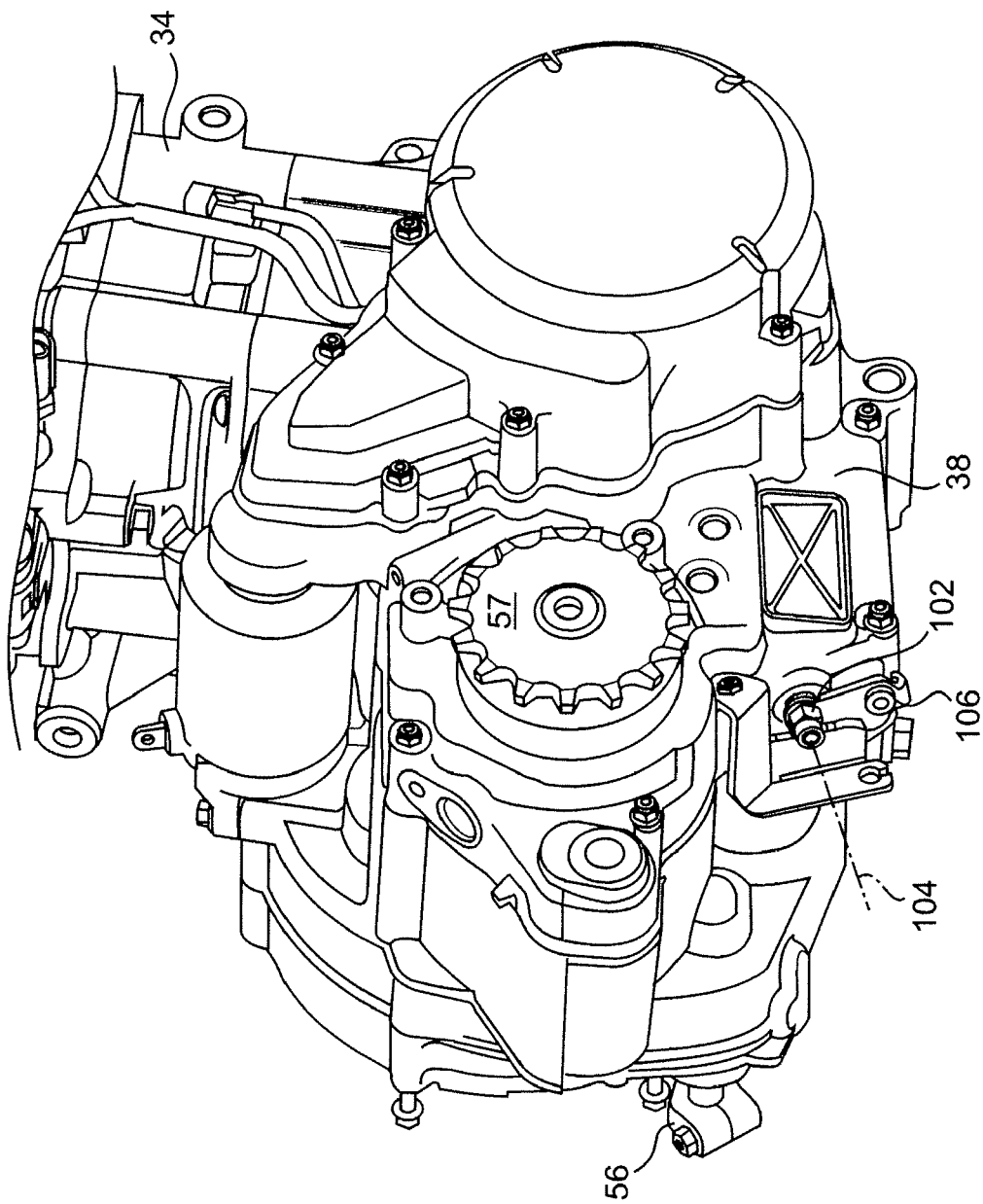
FIG. 7 is a partial rear left perspective view of the engine/transmission assembly of the vehicle shown in FIG. 1.

The lever 106 is disposed outside of the transmission casing 38 as shown in FIG. 7. Because the longitudinal axis 104 of the rotating shaft 102 is substantially perpendicular to the axis of rotation 85 of the shift drum 86, the lever 106 protrudes from and extends at the rear portion of the transmission 38, out of the way of the chain sprocket and out of the path of the chain 40 (FIG. 1). Referring back to FIGS. 3 and 4, the lever 106 is rigidly connected to the rotating shaft 102 at one end 112 and includes a connector 113 at its other end 114 which is adapted for connection to a cable or rod, itself connected to an actuator such as a handle 17 mounted on to the handle bar 20 (FIG. 2) which is controlled by the operator of the ATV. It is also contemplated that the longitudinal axis 104 of the rotating shaft 102 could be at an angle of between 60° and 120° relative to the axis of rotation 85 of the shift drum 86.

The lock 108 is preferably welded to the side portion 109 of the rotating shaft 102. The portion 115 of lock 108 is positioned adjacent to the shift drum 86 and preferably features a curve profile that conforms to the circular profile of the shift drum 86. The portion 115 of lock 108 also includes a locking surface 117 which is angled parallel to a line extending radially from the axis of rotation 85 of the shift drum 86. The lock 108 preferably includes an extension 119 adapted to prevent over rotation of the lock 108 by the force of the coil spring 111 when the lock 108 is in the locking position as illustrated in FIGS. 3 and 4. When in the locking position, the extension 119 of the lock 108 abuts against a portion of the transmission 38 and therefore prevents further rotation of the reverse gear lock device 100.

As best seen in FIG. 4, the shift drum 86 includes a stopper 123 extending radially from the cylindrical body 87 of the shift drum 86. The stopper 123 has a generally cylindrical shape. The stopper 123 is aligned with the lock 108 such that the shift drum 86 is prevented from rotating counter clockwise beyond the lock 108, as indicated by arrow 124, with the lock 108 in its initial position as shown in FIGS. 3 and 4. The stopper 123 and the lock 108 together form a locking mechanism whereby the shift drum 86 cannot rotate further in one direction when the stopper 123 abuts against the locking surface 117.

The shift fork 82 is operatively engaged with the shift gear 48 positioned adjacent to the idle gear 78 of the output shaft 70. The followers 110 of the shift fork 82 is inserted into the groove 90 of the shift drum 86 and therefore the movement of the shift fork 82 are dictated by the pattern of the groove 90 and by the rotation of the shift drum 86. To engage the reverse gear 58, the shift fork 82 has to move the shift gear 48 along the output shaft 70 and into engagement with the idle gear 78 which is already engaged to the reverse gear 58. However, the shift drum 86 is prevented from rotating by the stopper 123 abutting against the locking surface 117 of the lock 108 such that the shift gear 48 cannot be moved into engagement with the idle gear 78 and remains at a distance "A" from the idle gear 78 such that the reverse gear 58 cannot be engaged. The pattern of the groove 90 that moves the follower 110 of the shift fork 82 and therefore moves the shift gear 48 into engagement with the idle gear 78 is located in a section of the circumference of the shift drum 86 that is only accessible when the lock 108 is out of the way of the stopper 123.

Figure 5:
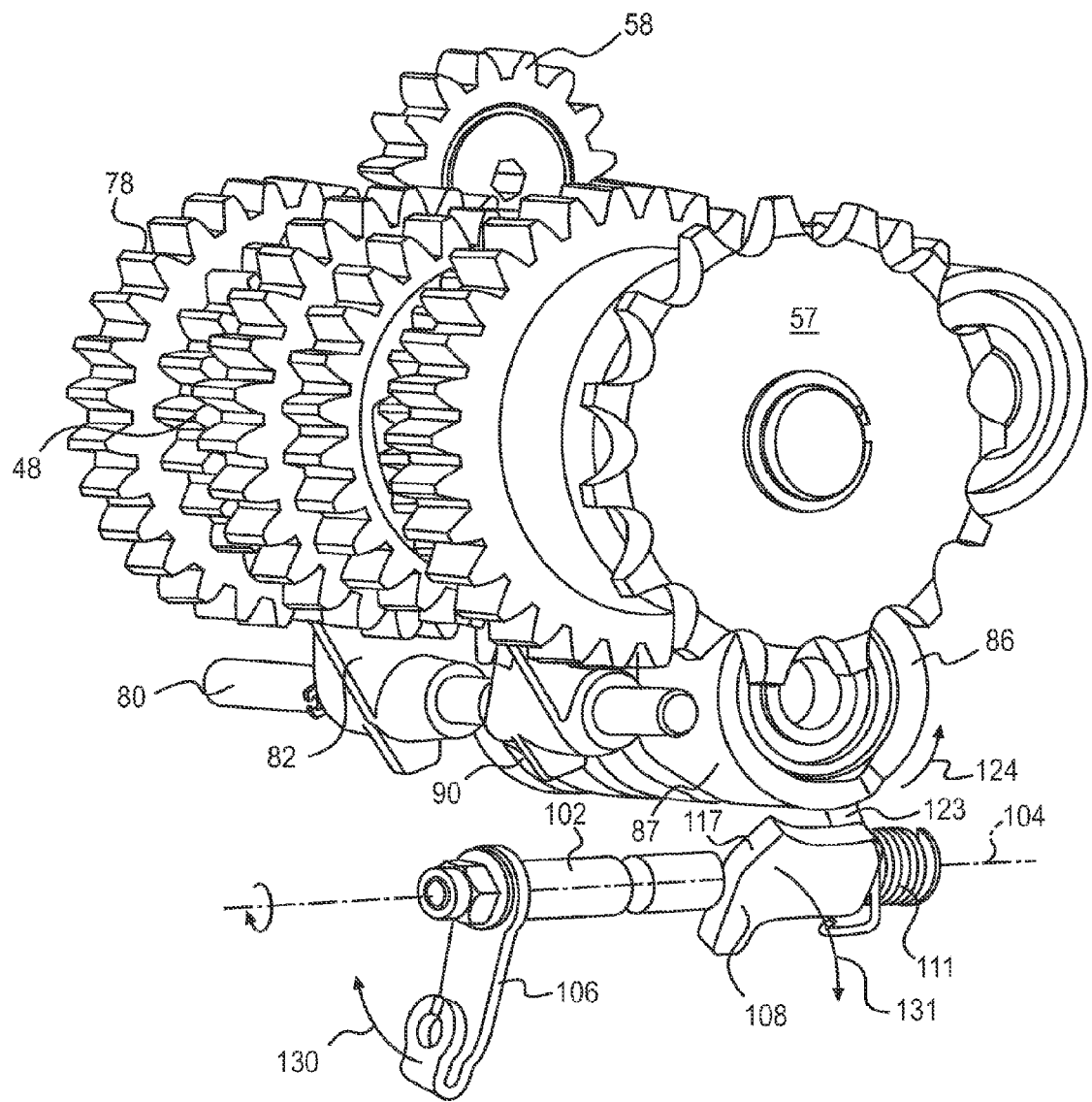
FIG. 5 is a rear, right perspective view of the internal components of the transmission shown in FIG. 3 with some of the internal components in a second position.
Figure 6:
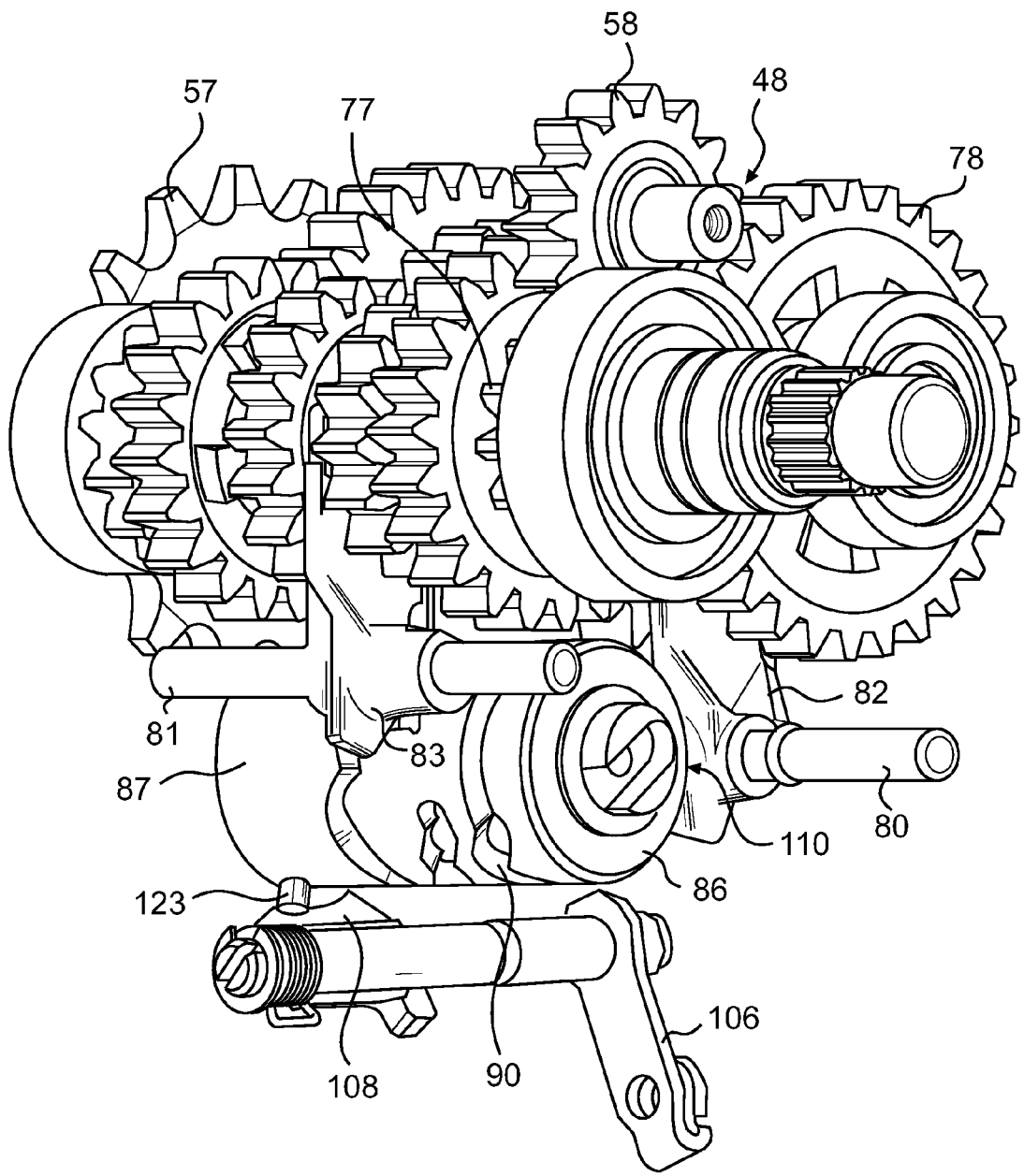
FIG. 6 is a front, left perspective view of the internal components of the transmission shown in FIG. 5.

With reference to FIGS. 5 and 6, in operation, in order to engage the reverse gear 58, the operator of the vehicle actuates the lever 106 as illustrated by arrow 130 so as to rotate the rotating shaft 102 clockwise and tilt the lock 108 to one side as illustrated by arrow 131. With the lock 108 tilted sideways as illustrated in FIGS. 5 and 6, the locking surface 117 of the lock 108 is out of the path of the stopper 123 and no longer prevents rotation of the shift drum 86. With the lock 108 tilted sideways and out of the path of the stopper 123, the operator of the ATV 10 is able to actuate the gear selector (foot pedal 56 shown in FIG. 1) to rotate the shift drum 86 counter clockwise as depicted by arrow 124 to move the shift gear 48 into engagement with the idle gear 78 thereby engaging the reverse gear 58. As illustrated in FIGS. 5 and 6, the stopper 123 has moved passed the lock 108 and the shift drum 86 has rotated counter clockwise further such that the portion of the pattern of the groove 90 that moves the shift fork 82 has been accessed and the shift gear 48 has moved into contact with the idle gear 78 indicating that the shift gear 48 has engaged the idle gear 78. As best seen in FIG. 5, the stopper 123 is now leaning against the side of the lock 108, the shift gear 48 is in contact with the idle gear 78 and therefore the reverse gear 58 is engaged to the output shaft 70. The cylindrical shape of the stopper 123 minimizes the friction between itself and the side of the lock 108 when the shift drum 86 is rotated passed the lock 108.

The coil spring 111 positioned over the rotating shaft 102 includes an extended hook 121 which is adapted to return the lock 108 to its initial position as shown in FIGS. 3 and 4. When the operator of the vehicle actuate the gear selector (foot pedal 56 shown in FIG. 2) to return the transmission 38 out of the reverse gear, the shift drum 86 is rotated back clockwise, the stopper 123 returns to the position illustrated in FIG. 4 and the lock 108 returns its initial position. The coil spring 111 is biasing the lock 108 back to the initial locking position shown in FIG. 4 so that the operator of the vehicle does not have to actuate the lever 106 in order to reengage the reverse gear lock 108.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A transmission for a vehicle, the transmission comprising:
   a casing;
   an output shaft positioned inside the casing and having at least one output gear;
   an input shaft positioned inside the casing and having at least one input gear;
   a reverse gear mounted onto a shaft positioned between the output shaft and the input shaft;
   at least one shift fork engaging one of the at least one output gear and at least one input gear;
   a rotatable shift drum having an axis of rotation, the shift drum operatively connected to the at least one shift fork, the shift drum and the at least one shift fork cooperating to engage at least one of the at least one output gear, the at least one input gear and the reverse gear when the shift drum is rotated, the shift drum having a body and a stopper extending from the body of the shift drum;
   a reverse gear locking device including a rotating shaft having a longitudinal axis, the rotating shaft adapted for rotational movement about the longitudinal axis, the longitudinal axis of the rotating shaft being substantially perpendicular to the axis of rotation of the shift drum; and
   a lock connected to the rotating shaft and positioned in alignment with the shift drum, the lock having an initial position where the lock is aligned with the stopper of the shift drum and prevents rotation of the shift drum to engage the reverse gear, and a second position where the lock is not aligned with the stopper of the shift drum and allows rotation of the shift drum so as to permit engagement of the reverse gear, wherein the lock is moved from the initial position to the second position by a rotational movement of the rotating shaft about the longitudinal axis.

2. A transmission as defined in claim 1, wherein reverse gear locking device further includes a lever connected to an end of the rotating shaft, the lever including a connecter adapted for connection to an actuator controlled by an operator of the vehicle.

3. A transmission as defined in claim 2, wherein the lever is disposed outside the transmission casing and extends at a rear portion of the transmission casing.

4. A transmission as defined in claim 1, wherein the body of the shift drum is generally cylindrical; the lock is positioned adjacent to the shift drum and includes a curve profile that conforms to the generally cylindrical body of the shift drum.

5. A transmission as defined in claim 1, wherein the lock includes a locking surface which is angled parallel to a line extending radially from the axis of rotation of the shift drum, the locking surface adapted to abut against the stopper of the shift drum.

6. A transmission as defined in claim 1, wherein the reverse gear locking device further comprises a spring biasing the lock toward the initial position.

7. A transmission as defined in claim 6, wherein the lock includes an extension adapted to prevent over rotation of the lock by the force of the coil spring when the lock is in the initial position.

8. A transmission as defined in claim 6, wherein the spring is a coil spring positioned over the rotating shaft.

9. A transmission as defined in claim 1, wherein the stopper has cylindrical shape.

10. A vehicle having:
    a frame;
    an engine supported by the frame;
    at least two wheels connected to the frame via a suspension;
    a seat disposed on the frame;
    a steering member disposed in front of the seat for steering the vehicle
    a shift lever;
    a transmission connected to the engine and operatively connected to at least one of the at least two wheels, the transmission including:
    a casing;
    an output shaft positioned inside the casing and having at least one output gear;
    an input shaft positioned inside the casing and having at least one input gear;
    a reverse gear mounted onto a shaft positioned between the output shaft and the input shaft;
    at least one shift fork engaging one of the at least one output gear and at least one input gear;
    a rotatable shift drum having an axis of rotation, the shift drum operatively connected to the at least one shift fork, the shift drum and the at least one shift fork cooperating to engage at least one of the at least one output gear, the at least one input gear and the reverse gear when the shift drum is rotated, the shift drum having a body and a stopper extending from the body of the shift drum;

a reverse gear locking device including a rotating shaft having a longitudinal axis, the rotating shaft adapted for rotational movement about the longitudinal axis, the longitudinal axis of the rotating shaft being substantially perpendicular to the axis of rotation of the shift drum; and a lock connected to the rotating shaft and positioned in alignment with the stopper of the shift drum thereby preventing the shift drum from engaging the reverse gear; wherein a rotational movement of the rotating shaft tilts the lock out of alignment with the stopper thereby allowing the shift drum to rotate so as to permit engagement of the reverse gear.

11. A vehicle as defined in claim 10, wherein the reverse gear locking device further includes a lever connected to an end of the rotating shaft, the lever including a connecter adapted for connection to an actuator controlled by an operator of the vehicle.

12. A vehicle as defined in claim 11, wherein the lever is disposed outside the transmission casing and extends at a rear portion of the transmission casing.

13. A vehicle as defined in claim 10, wherein the reverse gear locking device further comprises a spring biasing the lock in alignment with the stopper.

14. A vehicle as defined in claim 13, wherein the lock includes an extension adapted to prevent over rotation of the lock by the force of the coil spring when the lock is in alignment with the stopper.

15. A transmission for a vehicle, the transmission comprising:

a casing;

an output shaft positioned inside the casing and having at least one output gear;

an input shaft positioned inside the casing and having at least one input gear;

a reverse gear mounted onto a shaft positioned between the output shaft and the input shaft;

at least one shift fork engaging one of the at least one output gear and at least one input gear;

a rotatable shift drum having an axis of rotation, the shift drum operatively connected to the at least one shift fork; the shift drum and the at least one shift fork cooperating to engage at least one of the at least one output gear, at least one input gear and reverse gear when the shift drum is rotated, the shift drum having a body and a stopper extending from the body of the shift drum; and a reverse gear locking device including a rotating shaft having a longitudinal axis, the rotating shaft adapted for rotational movement about the longitudinal axis, the longitudinal axis of the rotating shaft being substantially perpendicular to the axis of rotation of the shift drum, a lock connected to the rotating shaft and positioned in alignment with the stopper of the shift drum thereby preventing the shift drum from engaging the reverse gear; wherein a rotational movement of the rotating shaft tilts the lock out of alignment with the stopper thereby allowing the shift drum to rotate past the lock so as to permit engagement of the reverse gear.

* * * * *